(12) United States Patent
Qin et al.

(10) Patent No.: US 10,502,884 B2
(45) Date of Patent: Dec. 10, 2019

(54) LIGHT GUIDE PLATE, MANUFACTURING METHOD THEREOF, BACKLIGHT MODULE AND DISPLAY DEVICE

(71) Applicant: BOE TECHNOLOGY GROUP CO., LTD., Beijing (CN)

(72) Inventors: Guangkui Qin, Beijing (CN); Xinxing Wang, Beijing (CN); Ming Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/092,918

(22) Filed: Apr. 7, 2016

(65) Prior Publication Data
US 2016/0320546 A1    Nov. 3, 2016

(30) Foreign Application Priority Data
Apr. 29, 2015    (CN) .......................... 2015 1 0212544

(51) Int. Cl.
    *F21V 8/00*    (2006.01)
(52) U.S. Cl.
    CPC ........... *G02B 6/005* (2013.01); *G02B 6/0043* (2013.01)
(58) Field of Classification Search
    USPC ....................................... 362/629
    See application file for complete search history.

(56) References Cited

U.S. PATENT DOCUMENTS

| | | | |
|---|---|---|---|
| 2005/0244608 A1* | 11/2005 | Arakawa | B32B 7/12 428/137 |
| 2007/0222915 A1 | 9/2007 | Niioka et al. | |
| 2008/0211984 A1 | 9/2008 | Sugibayashi et al. | |
| 2010/0027275 A1* | 2/2010 | Ohmi | C08J 7/12 362/351 |
| 2014/0355295 A1* | 12/2014 | Kuchinsky | G02B 6/001 362/558 |

FOREIGN PATENT DOCUMENTS

| | | |
|---|---|---|
| CN | 101042490 A | 9/2007 |
| CN | 101149516 A | 3/2008 |
| CN | 102460286 A | 5/2012 |
| CN | 202748493 U | 2/2013 |

OTHER PUBLICATIONS

First Office Action dated Jun. 2, 2017 in corresponding Chinese Patent Application No. 201510212544.9.

* cited by examiner

*Primary Examiner* — Rafferty D Kelly
(74) *Attorney, Agent, or Firm* — Nath, Goldberg & Meyer; Joshua B. Goldberg

(57) ABSTRACT

The invention discloses a light guide plate, a manufacturing method thereof, a backlight module and a display device. The light guide plate comprises a main body, a transparent material layer is arranged on a surface of the main body, and a scattering structure is arranged in the transparent material layer. The scattering structure can change the outgoing direction of first light entering the scattering structure, so that the first light has different outgoing directions, and thus a display panel can achieve normal display even in a dark environment.

20 Claims, 1 Drawing Sheet ved by the present invention, a transparent material layer
LIGHT GUIDE PLATE, MANUFACTURING METHOD THEREOF, BACKLIGHT MODULE AND DISPLAY DEVICE

CROSS-REFERENCE TO RELATED APPLICATION

This application claims the benefit of priority to China Patent Application No. 201510212544.9, titled "Light Guide Plate, Manufacturing Method Thereof, Backlight Module and Display Device" and filed on Apr. 29, 2015, the content thereof being incorporated herein by reference.

FIELD OF THE INVENTION

The present invention relates to the field of display technology, and particularly relates to a light guide plate, a manufacturing method thereof, a backlight module and a display device.

BACKGROUND OF THE INVENTION

A backlight module in a liquid crystal display panel includes a light guide plate. The light guide plate is used for guiding the scattering direction of light, so as to improve brightness of the display panel and ensure brightness uniformity of the display panel. According to different positions of light sources, backlight modules may be divided into side-type backlight modules and direct-type backlight modules. A light source in a side-type backlight module is arranged on a side of a light guide plate, while a light source in a direct-type backlight module is arranged below a light guide plate.

FIG. 1 is a schematic structure diagram of a light guide plate in a side-type backlight module in the prior art. As shown in FIG. 1, a reflector 105 is arranged on a side (light incident side) of the light guide plate, and a light source 106 is arranged in the reflector 105. Light enters the light guide plate from the light incident side of the light guide plate, and exits from two surfaces of the light guide plate. The light guide plate is generally used, in combination with the reflector, in a transmission type liquid crystal display panel. For example, a front light guide plate used in a reflection type electronic book emits light from two surfaces thereof within large angles. However, as to a reflection type liquid crystal display panel, since a polarizer and a color filter absorb light, in the case of the existing light guide plate, normal display cannot be achieved or the contrast is low in a dark environment.

SUMMARY OF THE INVENTION

To solve the above problems, the present invention provides a light guide plate, a manufacturing method thereof, a backlight module and a display device, which can improve the contrast of a display panel, so that the display panel can achieve normal display even in a dark environment.

Thus, the present invention provides a light guide plate, including a main body, wherein a transparent material layer is arranged on a surface of the main body, and a scattering structure is arranged in the transparent material layer, and is configured to change outgoing direction of first light entering the scattering structure, so that the first light has different outgoing directions.

Optionally, an absorbing structure is arranged on one side of the scattering structure away from the main body, and is configured to absorb second light entering the absorbing structures.

Optionally, a plurality of scattering structures and a plurality of absorbing structures are arranged in the transparent material layer, and are distributed as mesh spots.

Optionally, the scattering structure has a convex surface protruding towards the light guide plate on one side of the scattering structure close to the main body, and the convex surface is arc-shaped.

Optionally, the main body is made of polymethyl methacrylate, and the transparent material layer is made of optical clear adhesive.

The present invention further provides a backlight module, including any one of the above light guide plates.

The present invention further provides a display device, including the above backlight module.

The present invention further provides a manufacturing method of a light guide plate, including:

forming a transparent material layer on a main body of the light guide plate; and forming a scattering structure in the transparent material layer, wherein the scattering structure is configured to change outgoing direction of first light entering the scattering structure, so that the first light has different outgoing directions.

Optionally, the method further includes:

forming an absorbing structure on one side of the scattering structure away from the main body, wherein the absorbing structure is configured to absorb second light entering the absorbing structure.

Optionally, the step of forming a scattering structure in the transparent material layer includes:

forming a groove in the transparent material layer; and forming the scattering structure in the grooves, wherein a depth of the groove in the transparent material layer is greater than a thicknesses of the scattering structure in a depth direction of the groove; and the step of forming the absorbing structure on the scattering structures includes:

forming the absorbing structure in the grooves with the scattering structures formed therein.

Optionally, the step of forming the groove in the transparent material layer includes: forming a plurality of grooves distributed as mesh spots in the transparent material layer.

Optionally, a bottom surface of the groove is in the shape of concave arc.

The present invention has the following beneficial effects:

In the light guide plate, the manufacturing method thereof, the backlight module and the display device provided by the present invention, a transparent material layer is arranged on a surface of the main body of the light guide plate, a scattering structure is arranged in the transparent material layer, and can change the outgoing direction of first light entering the scattering structure, so that the first light has different outgoing directions, and as a result, the display panel has an improved contrast and can achieve normal display even in a dark environment.

DESCRIPTION OF THE PREFERRED EMBODIMENT

In order that those skilled in the art better understand the technical solutions of the present invention, a light guide plate, a manufacturing method thereof, a backlight module and a display device provided by the present invention will be described in detail below in conjunction with the accompanying drawings.

First Embodiment

Figure 1:
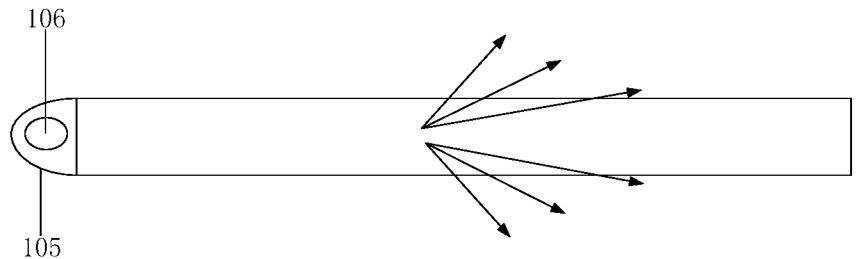
FIG. 1 is a schematic structure diagram of a light guide plate in the prior art.
Figure 2:
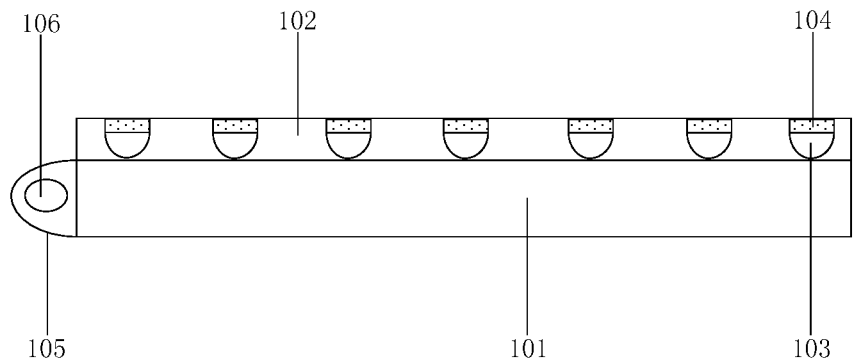
FIG. 2 is a schematic structure diagram of a light guide plate provided by a first embodiment of the present invention.

FIG. 2 is a schematic structure diagram of a light guide plate provided by a first embodiment of the present invention. As shown in FIG. 2, the light guide plate includes a main body 101, a transparent material layer 102 is arranged on a surface (the upper surface in FIG. 2, but the present invention is not limited thereto) of the main body 101, and a scattering structure 103 are arranged in the transparent material layer. The scattering structure 103 may be made of a white scattering material. The scattering structure 103 can change the outgoing direction of light (referred to as first light hereinafter) entering the scattering structure 103, so that the first light has different outgoing directions, and as a result, the display panel has an improved contrast and can achieve normal display even in a dark environment.

In this embodiment, an absorbing structure 104 is arranged on one side of the scattering structure 103 away from the main body 101, and the absorbing structure 104 absorbs light (referred to as second light hereinafter) entering the absorbing structure 104. Specifically, the absorbing structure 104 has at least the following two functions: absorbing ambient light from the outside, and absorbing light passing through the scattering structures 103 inside the light guide plate. The absorbing structure 104 may be made of a black absorbing material. The light guide plate provided by this embodiment emits light unidirectionally, and has a good light emergent direction.

Optionally, the scattering structure 103 has a convex surface protruding towards the light guide plate on one side thereof close to the main body, and the convex surface is arc-shaped. Optionally, a plurality of scattering structures 103 and a plurality of absorbing structures 104 may be arranged in the transparent material layer, and are distributed as mesh spots, and preferably, distributed uniformly. The uniformity of the emergent light may be adjusted by adjusting the size and the density value of the spots.

In this embodiment, the material of the main body 101 includes polymethyl methacrylate, and the material of the transparent material layer 102 includes optical clear adhesive (OCA). As shown in FIG. 2, a reflector 105 is arranged on the light incident side of the main body 101, and a light source 106 is arranged in the reflector 105. Light enters the light guide plate from the light incident side of the light guide plate, and then exits from the light emergent side of the light guide plate. In addition, because the scattering structures 103 obviously can reflect light, the light guide plate of this embodiment does not need an additional reflecting sheet.

In the light guide plate provided by this embodiment, a transparent material layer is arranged on a surface of the main body of the light guide plate, a scattering structure is arranged in the transparent material layer, and can change the outgoing direction of first light entering the scattering structure, so that the first light has different outgoing directions, and as a result, the display panel has an improved contrast and can achieve normal display even in a dark environment.

Second Embodiment

This embodiment provides a backlight module, including the light guide plate provided by the first embodiment described above. For the specific contents of the light guide plate, reference may be made to the description of the first embodiment, and redundant description will not be given here.

In the backlight module provided by this embodiment, a transparent material layer is arranged on a surface of the main body of the light guide plate, a scattering structure is arranged in the transparent material layer, and can change the outgoing direction of first light entering the scattering structure, so that the first light has different outgoing directions, and as a result, the display panel has an improved contrast and can achieve normal display even in a dark environment.

Third Embodiment

This embodiment provides a display device, including the backlight module provided by the second embodiment described above. For the specific contents of the backlight module, reference may be made to the description of the second embodiment, and redundant description will not be given here.

In the display device provided by this embodiment, a transparent material layer is arranged on a surface of the main body of the light guide plate, a scattering structure is arranged in the transparent material layer, and can change the outgoing direction of first light entering the scattering structure, so that the first light has different outgoing directions, and as a result, the display panel has an improved contrast and can achieve normal display even in a dark environment.

Fourth Embodiment

Figure 3:
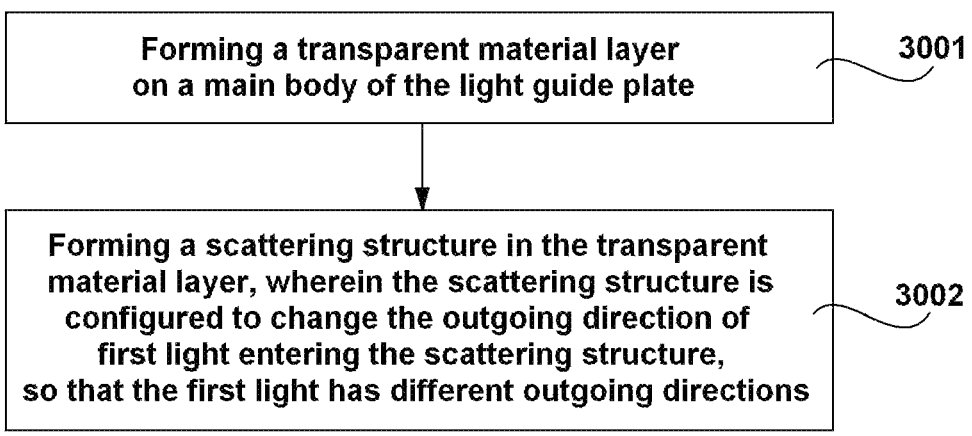
FIG. 3 is a flow diagram of a manufacturing method of a light guide plate provided by a fourth embodiment of the present invention.

FIG. 3 is a flow diagram of a manufacturing method of a light guide plate provided by a fourth embodiment of the present invention. As shown in FIG. 3, the manufacturing method includes steps 3001 and 3002.

At step 3001, a transparent material layer is formed on a main body of the light guide plate.

At step 3002, a scattering structure is formed in the transparent material layer, wherein the scattering structure is configured to change the outgoing direction of first light entering the scattering structure, so that the first light has different outgoing directions.

Referring to FIG. 2, a transparent material layer 102 is formed on a main body 101 of the light guide plate, the main body 101 may be made of polymethyl methacrylate, and the transparent material layer 102 may be made of optical clear adhesive. However, the present invention is not limited thereto, and any other suitable materials may be used for forming the main body 101 and the transparent material layer 102.

Next, a groove is formed in the transparent material layer 102. Preferably, a plurality of grooves are formed and distributed as mesh spots. The uniformity of the emergent light may be adjusted by adjusting the size and the density value of spots. Optionally, the bottom surface of the groove is in the shape of concave arc.

In this embodiment, the scattering structure 103 is formed in the groove. The scattering structure 103 is made of a white scattering material. The scattering structure 103 can change the outgoing direction of first light entering the scattering structure 103, so that the first light has different outgoing directions, and as a result, the display panel had an improve contrast and can achieve normal display even in a dark environment.

Optionally, an absorbing structure 104 is formed on the scattering structure 103. That is, an absorbing structure 104 is formed on one side of the scattering structure 103 away from the main body 101. Specifically, when the scattering structure 103 is formed in the groove, the scattering structure 103 can be formed to only occupy the lower portion of the groove. That is to say, the depths of the groove in the transparent material layer 102 are greater than the thickness of the scattering structure 103 in the depth direction of the groove.

Later, the portion not occupied by the scattering structure 103 in the groove is filled with a light absorbing material to form the absorbing structure 104.

The absorbing structure 104 absorbs second light entering the absorbing structure 104. Specifically, the absorbing structure 104 has at least the following two functions: absorbing ambient light from the outside, and absorbing light capable of passing through the scattering structure 103 inside the light guide plate. The absorbing structure 104 may be made of a black absorbing material. The light guide plate provided by this embodiment emits light unidirectionally, and has a good light emergent direction. In another example, as an alternative of forming the groove, the scattering structure and the absorbing structure can be separately formed and then combined with the main body to obtain the light guide plate of the present invention. Specifically, an absorbing structure film is formed on a substrate, and a scattering structure film is formed on the absorbing structure film. Then, the lamination of the scattering structure film and the absorbing structure film is etched, so that the scattering structure and the absorbing structure distributed in one-to-one correspondence are formed. In a specific example, the upper surface of the scattering structure on the absorbing structure may be formed into a convex surface, e.g. in the shape of convex arc, by partial etching. Then, an optical clear adhesive is coated on the substrate on which the scattering structure and the absorbing structure are formed to completely cover the scattering structure and the absorbing structure; and the scattering structure and the absorbing structure, together with the substrate, are bonded with the main body through the optical clear adhesive. Later, the substrate may be removed by any known method (e.g. stripping or etching), so that the light guide plate is formed.

In the manufacturing method of a light guide plate provided by this embodiment, a transparent material layer is arranged on a surface of the main body of the light guide plate, a scattering structure is arranged in the transparent material layer, and can change the outgoing direction of first light entering the scattering structure, so that the first light has different outgoing directions, and as a result, the display panel has an improved contrast and can achieve normal display even in a dark environment.

It could be understood that the above embodiments are merely exemplary embodiments adopted for describing the principle of the present invention, but the present invention is not limited thereto. Various variations and improvements may be made for those of ordinary skill in the art without departing from the spirit and essence of the present invention, and these variations and improvements shall also be encompassed within the protection scope of the present invention.

The invention claimed is:

1. A light guide plate, comprising a main body with a plate shape, wherein a transparent material layer with a plate shape is laminated on a surface of the main body, and a plurality of scattering structures are arranged in the transparent material layer, and are configured to change outgoing direction of first light entering the plurality of scattering structures, so that the first light has different outgoing directions, wherein a plurality of absorbing structures are arranged on a side of the plurality of scattering structures away from the main body and are configured to absorb second light entering the plurality of absorbing structures, wherein both the plurality of scattering structures and the plurality of absorbing structures are distributed as mesh spots spaced apart from each other.

2. The light guide plate of claim 1, wherein the plurality of scattering structures and the plurality of absorbing structures are in one-to-one correspondence.

3. The light guide plate of claim 1, wherein the plurality of scattering structures have convex surfaces protruding towards the main body on one side of the plurality of scattering structures close to the main body, and the convex surfaces are arc-shaped.

4. The light guide plate of claim 1, wherein the main body is made of polymethyl methacrylate, and the transparent material layer is made of optical clear adhesive.

5. A backlight module, comprising the light guide plate of claim 1.

6. The backlight module of claim 5, wherein the plurality of scattering structures and the plurality of absorbing structures are in one-to-one correspondence.

7. The backlight module of claim 5, wherein the plurality of scattering structures have convex surfaces protruding towards the main body on one side of the plurality of scattering structures close to the main body, and the convex surfaces are arc-shaped.

8. The backlight module of claim 5, wherein the main body is made of polymethyl methacrylate, and the transparent material layer is made of optical clear adhesive.

9. A display device, comprising the backlight module of claim 5.

10. The display device of claim 9, wherein the plurality of scattering structures and the plurality of absorbing structures are in one-to-one correspondence.

11. The display device of claim 9, wherein the plurality of scattering structures in the backlight module have a convex surface protruding towards the main body of the light guide plate on one side of the plurality of scattering structures close to the main body, and the convex surface is arc-shaped.

12. The display device of claim 9, wherein the main body of the light guide plate in the backlight module is made of polymethyl methacrylate, and the transparent material layer is made of optical clear adhesive.

13. The display device of claim 9, wherein the plurality of absorbing structures are made of a black absorbing material.

14. The backlight module of claim 5, wherein the plurality of absorbing structures are made of a black absorbing material.

15. The light guide plate of claim 1, wherein the plurality of absorbing structures are made of a black absorbing material.

16. A manufacturing method of a light guide plate, comprising:

laminating a transparent material layer with a plate shape on a main body of the light guide plate, wherein the main body has a plate shape;

forming a plurality of scattering structures distributed as mesh spots spaced apart from each other in the transparent material layer, wherein the plurality of scattering structures are configured to change outgoing direction of first light entering the plurality of scattering structures, so that the first light has different outgoing directions; and forming a plurality of absorbing structures distributed as mesh spots spaced apart from each other on a side of the plurality of scattering structures away from the main body, wherein the plurality of absorbing structures are configured to absorb second light entering the plurality of absorbing structures.

17. The manufacturing method of claim 16, wherein the step of forming the plurality of scattering structures distributed as mesh spots spaced apart from each other in the transparent material layer comprises:

forming a plurality of groove distributed as mesh spots spaced apart from each other in the transparent material layer; and forming the plurality of scattering structures in the plurality of grooves, wherein a depth of the plurality of grooves in the transparent material layer is greater than a thicknesses of the plurality of scattering structures in a depth direction of the grooves the step of forming the plurality of absorbing structures distributed as mesh spots spaced apart from each other on the side of the plurality of scattering structures away from the main body comprises:

forming the plurality of absorbing structures in the plurality of grooves with the plurality of scattering structures formed therein.

18. The manufacturing method of claim 17, wherein the plurality of scattering structures and the plurality of absorbing structures are formed to be in one-to-one correspondence.

19. The manufacturing method of claim 17, wherein a bottom surface of the plurality of grooves is in the shape of a concave arc.

20. The manufacturing method of claim 16, wherein the plurality of absorbing structures are made of a black absorbing material.

* * * * *